United States Patent
Obara

(10) Patent No.: US 7,689,063 B2
(45) Date of Patent: Mar. 30, 2010

(54) INFORMATION PROCESSING APPARATUS AND IMAGE PROCESSING METHOD

(75) Inventor: Eiki Obara, Hiki-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1042 days.

(21) Appl. No.: 11/377,118

(22) Filed: Mar. 16, 2006

(65) Prior Publication Data

US 2006/0215928 A1 Sep. 28, 2006

(30) Foreign Application Priority Data

Mar. 28, 2005 (JP) .............................. 2005-092781

(51) Int. Cl.
*G06K 9/32* (2006.01)

(52) U.S. Cl. ................... 382/293; 382/274; 382/275; 358/3.26; 358/3.27

(58) Field of Classification Search ................ 382/274, 382/275, 293; 358/3.26, 3.27, 463
See application file for complete search history.

(56) References Cited

U.S. PATENT DOCUMENTS

| | | | |
|---|---|---|---|
| 5,619,588 A * | 4/1997 | Yolles et al. ................. | 382/149 |
| 5,687,253 A * | 11/1997 | Huttenlocher et al. ....... | 382/177 |
| 5,907,628 A * | 5/1999 | Yolles et al. ................. | 382/149 |
| 6,249,604 B1 * | 6/2001 | Huttenlocher et al. ....... | 382/174 |
| 6,839,463 B1 * | 1/2005 | Blake et al. ................. | 382/173 |

FOREIGN PATENT DOCUMENTS

| | | |
|---|---|---|
| JP | 4-318784 | 11/1992 |
| JP | 05-316356 | 11/1993 |
| JP | 10-191332 | 7/1998 |
| JP | 2002-232889 | 8/2002 |
| JP | 2003-163807 | 6/2003 |
| JP | 2004-056190 | 2/2004 |
| WO | WO 2004/107736 | 12/2004 |

OTHER PUBLICATIONS

Japanese Patent Application No. 2005-092781, Notice of Reasons for Rejection, mailed Jun. 9, 2009, (English translation).

* cited by examiner

*Primary Examiner*—Yosef Kassa
(74) *Attorney, Agent, or Firm*—Blakely, Sokoloff, Taylor & Zafman LLP

(57) ABSTRACT

According to one embodiment, there is provided an information processing apparatus capable of processing image data involving a plurality of blocks. The apparatus includes a difference value detection unit which detects a difference value between pixel values of two adjacent pixels that are arranged via a block boundary contained in the image data in a direction perpendicular to the block boundary, and a correction unit which corrects pixel values of a plurality of pixels that are arranged via the block boundary in the direction perpendicular to the block boundary by distributing the difference value detected by the difference value detection unit to the plurality of pixels.

8 Claims, 8 Drawing Sheets

For P7 < P8

$P_i' = P_i + |P7-P8| \times \frac{1}{8} \times (i-3)$     ( i = 4, 5, 6, 7 )

$P_i' = P_i - |P7-P8| \times \frac{1}{8} \times (12-i)$     ( i = 8, 9, 10, 11 )

For P7 > P8

$P_i' = P_i - |P7-P8| \times \frac{1}{8} \times (i-3)$     ( i = 4, 5, 6, 7 )

$P_i' = P_i + |P7-P8| \times \frac{1}{8} \times (12-i)$     ( i = 8, 9, 10, 11 )

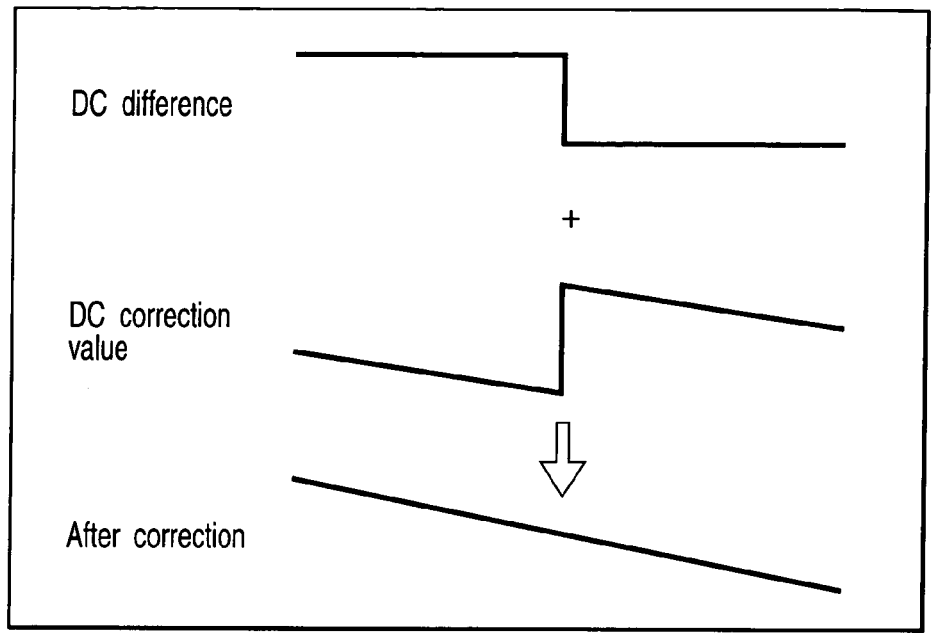

FIG. 8

Example of correction equations when weighting is performed

For $P7 < P8$ $Pi' = Pi + |P7-P8| \times \frac{1}{64} \times k$    ($k=1$ at $i=4$, $k=4$ at $i=5$, $k=9$ at $i=6$, $k=20$ at $i=7$)

$Pi' = Pi - |P7-P8| \times \frac{1}{64} \times k$    ($k=20$ at $i=8$, $k=9$ at $i=9$, $k=4$ at $i=10$, $k=1$ at $i=11$)

For $P7 > P8$ $Pi' = Pi - |P7-P8| \times \frac{1}{64} \times k$    ($k=1$ at $i=4$, $k=4$ at $i=5$, $k=9$ at $i=6$, $k=20$ at $i=7$)

$Pi' = Pi + |P7-P8| \times \frac{1}{64} \times k$    ($k=20$ at $i=8$, $k=9$ at $i=9$, $k=4$ at $i=10$, $k=1$ at $i=11$)

FIG. 9

INFORMATION PROCESSING APPARATUS AND IMAGE PROCESSING METHOD

CROSS-REFERENCE TO RELATED APPLICATIONS

This application is based upon and claims the benefit of priority from prior Japanese Patent Application No. 2005-092781, filed Mar. 28, 2005, the entire contents of which are incorporated herein by reference.

BACKGROUND

1. Field

One embodiment of the invention relates to an information processing apparatus such as a personal computer, and an image processing method used in the apparatus.

2. Description of the Related Art

There have recently been developed personal computers having the same AV functions as those of audio video (AV) devices such as a digital versatile disc (DVD) player and TV apparatus.

A personal computer of this type requires a function of decoding and reproducing image data which is compression-encoded by a block-encoding method such as MPEG. The block-encoding method such as MPEG processes image data block by block. Pixel groups adjacent to a block boundary are continuous on the time base, but belong to different blocks. Hence, these pixel groups are quantized at different precisions. Image data obtained by decoding block-encoded image data readily suffers block noise owing to distortion which occurs near the block boundary.

As a technique of reducing block noise, Jpn. Pat. Appln. KOKAI Publication No. 2002-232889 discloses a technique of calculating a reference correction amount in consideration of the pixel values of four pixels near a block boundary and correcting the pixel values of the four pixels by using the reference correction amount.

In recent years, most deblocking processing circuits for removing block noise adopt a low-pass filter. The low-pass filter smoothes the pixel value of each pixel in a pixel group near a block boundary by using the pixel values of pixels near the target pixel. This can reduce distortion of a signal near the block boundary.

When decoding and reproduction of image data are executed by software in an information processing apparatus such as a personal computer, the calculation amount of deblocking processing must be minimized.

Deblocking processing using a low-pass filter requires a large calculation amount. Hence, it is not practical to apply deblocking processing using the low-pass filter to the personal computer.

If deblocking processing using a low-pass filter is applied to image data containing a high-frequency component near a block boundary, the high-frequency component is lost by smoothing processing by the low-pass filter.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 8 is an exemplary view for explaining the principle of another linear DC correction executed by the information processing apparatus in FIG. 1;

FIG. 9 is an exemplary view for explaining an example of correction equations executed for nonlinear DC correction in the information processing apparatus in FIG. 1;

DETAILED DESCRIPTION

Various embodiments according to the invention will be described hereinafter with reference to the accompanying drawings. In general, according to one embodiment of the invention, there is provided an information processing apparatus capable of processing image data involving a plurality of blocks. The apparatus includes a difference value detection unit which detects a difference value between pixel values of two adjacent pixels that are arranged via a block boundary contained in the image data in a direction perpendicular to the block boundary, and a correction unit which corrects pixel values of a plurality of pixels that are arranged via the block boundary in the direction perpendicular to the block boundary by distributing the difference value detected by the difference value detection unit to the plurality of pixels.

The configuration of an information processing apparatus according to an embodiment will be explained with reference to FIGS. 1 and 2. The information processing apparatus is implemented as, e.g., a battery-drivable notebook type portable personal computer 10.

Figure 1:
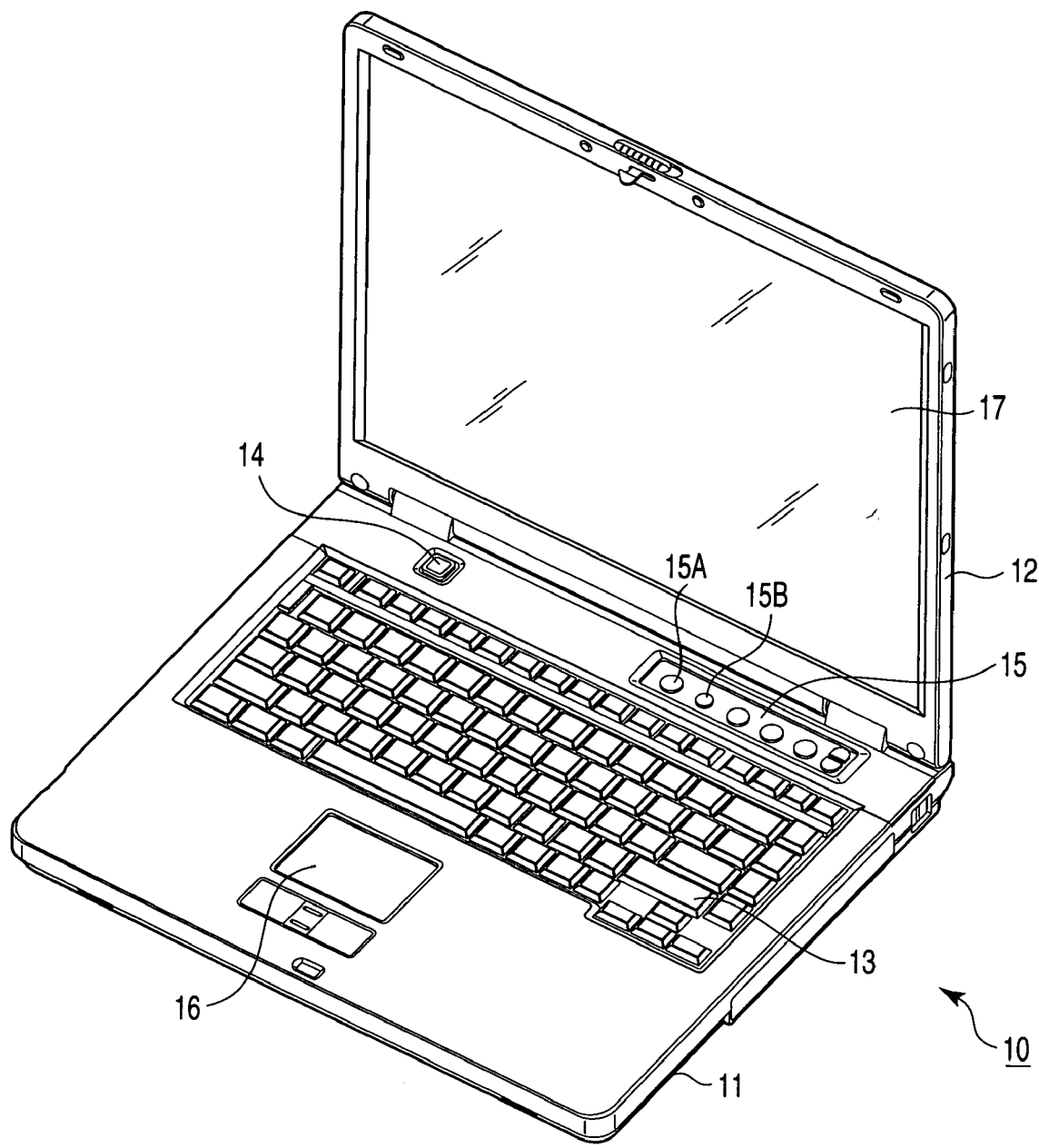
FIG. 1 is an exemplary perspective view showing the outer appearance of an information processing apparatus according to an embodiment of the present invention.

FIG. 1 is a perspective view when the display unit of the notebook type personal computer 10 is open. The computer 10 includes a computer body 11 and a display unit 12. The display unit 12 incorporates a display device formed from a liquid crystal display (LCD) 20, and the display screen of the LCD 20 is located at almost the center of the display unit 12.

The display unit 12 is supported by the computer body 11, and attached to the computer body 11 so that the display unit 12 freely pivots between an open position where the upper surface of the computer body 11 is exposed and a closed position where it is covered. The computer body 11 has a low-profile box-like housing, and its upper surface is equipped with a keyboard 13, a power button 14 for turning on/off the computer 10, an input operation panel 15, a touch pad 16, and the like.

The input operation panel 15 is an input device for inputting an event corresponding to a pressed button, and includes a plurality of buttons for activating a plurality of functions. These buttons include a TV start button 15A and DVD start button 15B. When the TV start button 15A is pressed by the user, an application program for executing the TV function is automatically activated. The DVD start button 15B is used to reproduce video contents recorded on a DVD. When the DVD start button 15B is pressed by the user, an application program for reproducing video contents is automatically activated.

The system configuration of the computer 10 will be explained with reference to FIG. 2.

Figure 2:
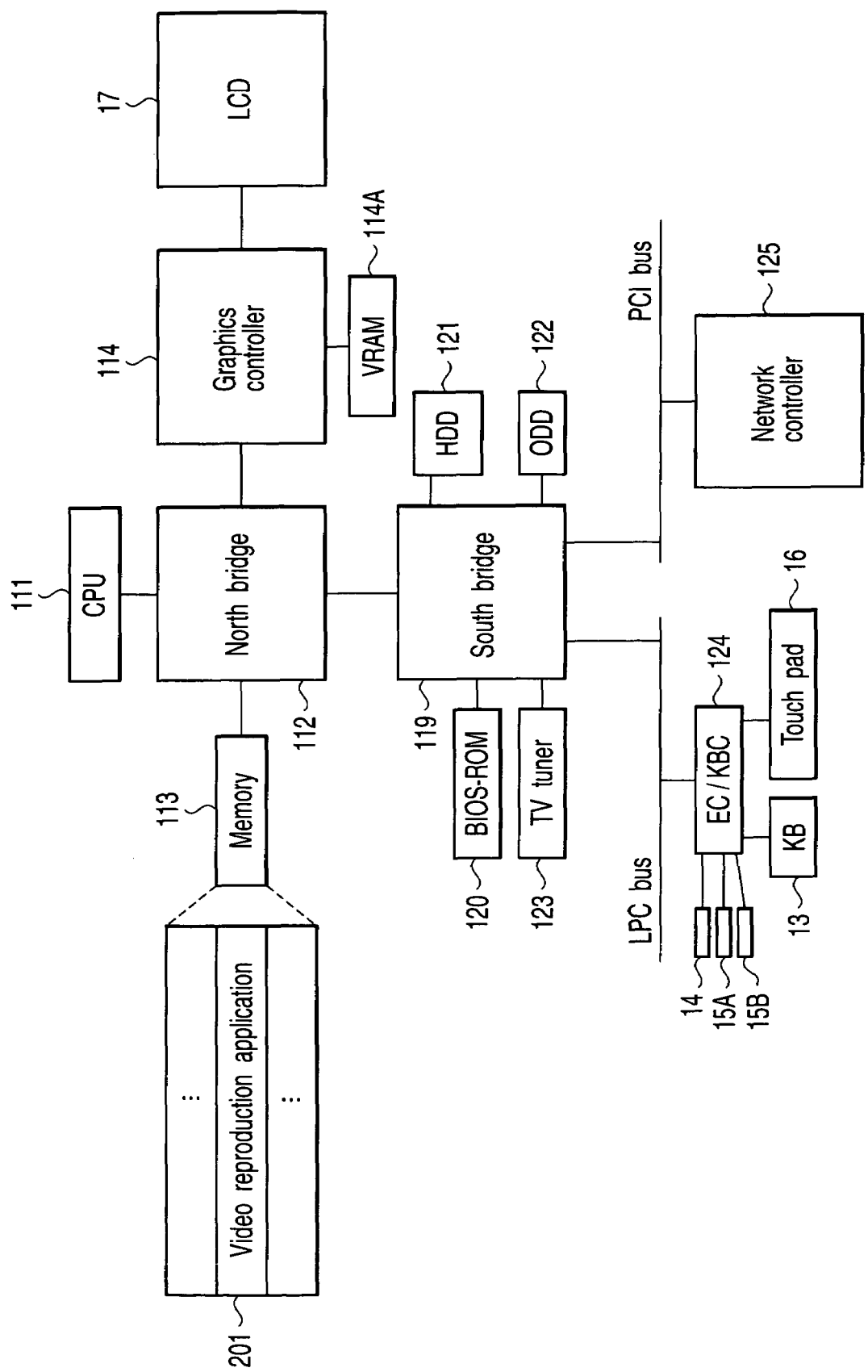
FIG. 2 is an exemplary block diagram showing an example of the system configuration of the information processing apparatus in FIG. 1.

As shown in FIG. 2, the computer 10 incorporates a CPU 111, north bridge 112, main memory 113, graphics controller 114, south bridge 119, BIOS-ROM 120, hard disk drive (HDD) 121, optical disk drive (ODD) 122, TV broadcasting tuner 123, embedded controller/keyboard controller. IC (EC/KBC) 124, network controller 125, and the like.

The CPU 111 is a processor adopted to control operation of the computer 10. The CPU 111 executes an OS (Operating System) and various application programs such as a video reproduction application program 201 that are loaded from the hard disk drive (HDD) 121 to the main memory 113.

The video reproduction application program 201 is a program for reproducing image data, and has a function of decoding digital image data which is compression-encoded by a block-encoding method such as MPEG2 (e.g., broadcasting program data which is received and compression-encoded by the TV broadcasting tuner 123, or MPEG2 video contents read out from the optical disk drive (ODD) 122).

Figure 3:
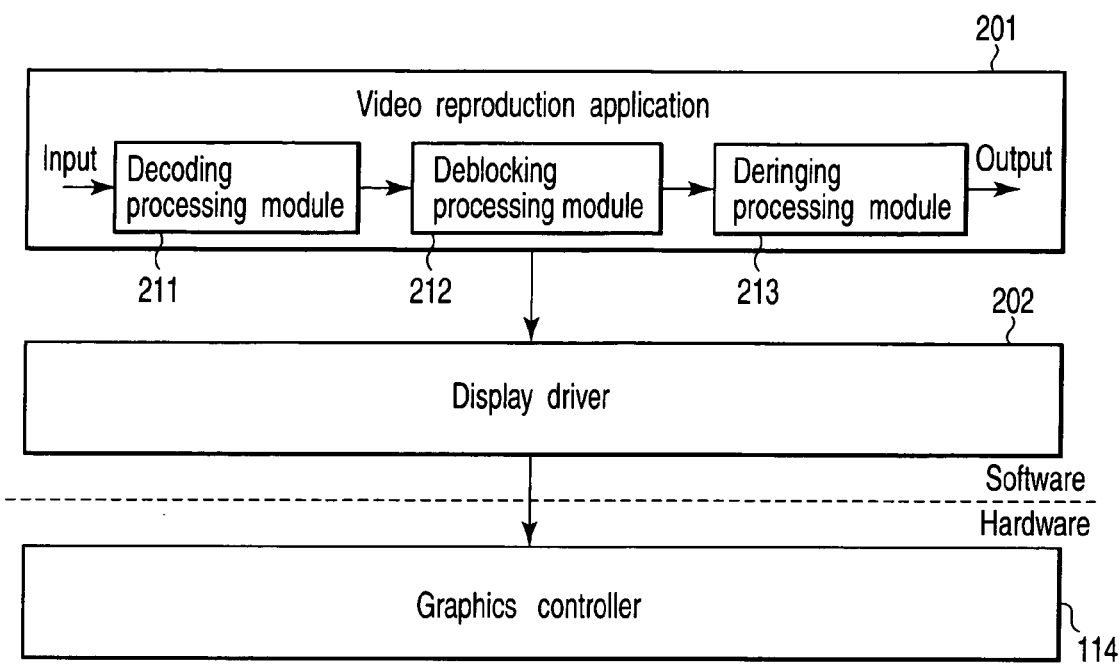
FIG. 3 is an exemplary block diagram for explaining the configuration of a video reproduction application program executed by the information processing apparatus in FIG. 1.

As shown in FIG. 3, the video reproduction application program 201 includes a decoding processing module 211, deblocking processing module 212, and deringing processing module 213.

The decoding processing module 211 is a software decoder which decodes moving image data compression-encoded by a block-encoding method such as MPEG2. The deblocking processing module 212 and deringing processing module 213 are used to improve the quality of decoded moving image data. The deblocking processing module 212 executes deblocking processing of reducing block noise contained in decoded moving image data. The deringing processing module 213 executes deringing processing of reducing ringing noise contained in moving image data having undergone deblocking processing. Moving image data having undergone deringing processing is sent to the graphics controller 114 via a display driver 202.

The CPU 111 executes the video reproduction application program 201 to perform decoding processing, deblocking processing, and deringing processing in the memory 113.

Deblocking processing executed by the deblocking processing module 212 will be explained with reference to FIGS. 4 and 5.

Figure 4:
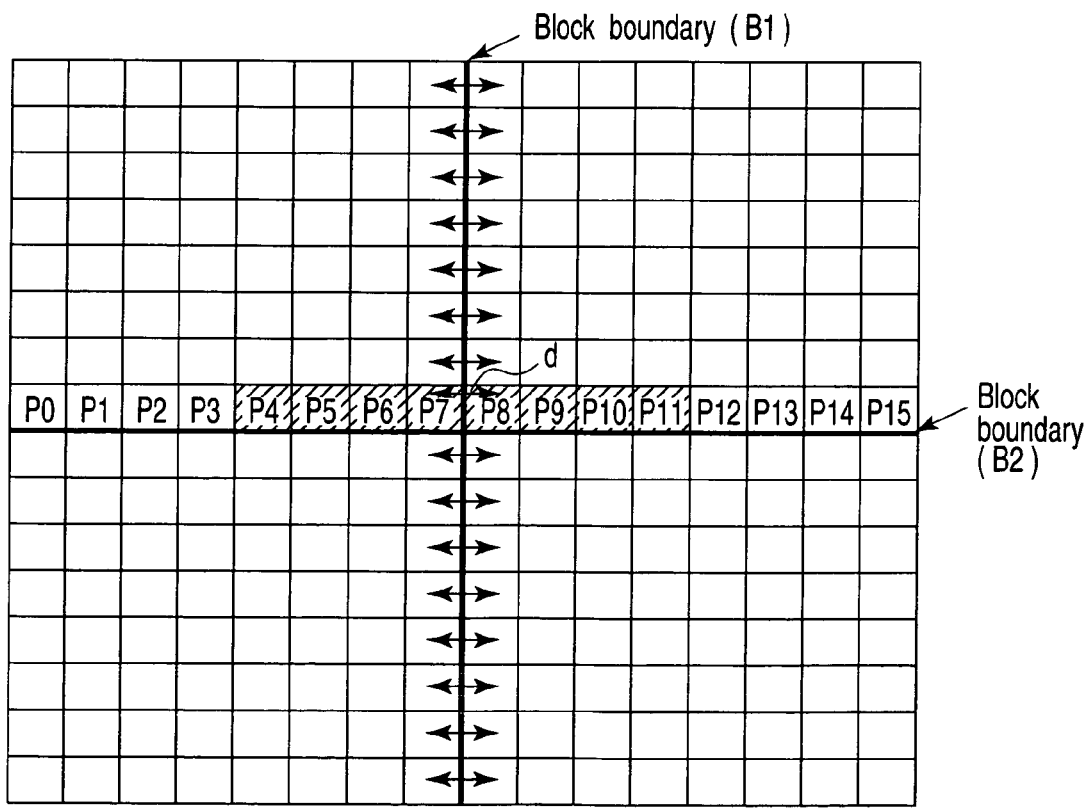
FIG. 4 is an exemplary view for explaining image data processed by the information processing apparatus in FIG. 1.
Figure 5:
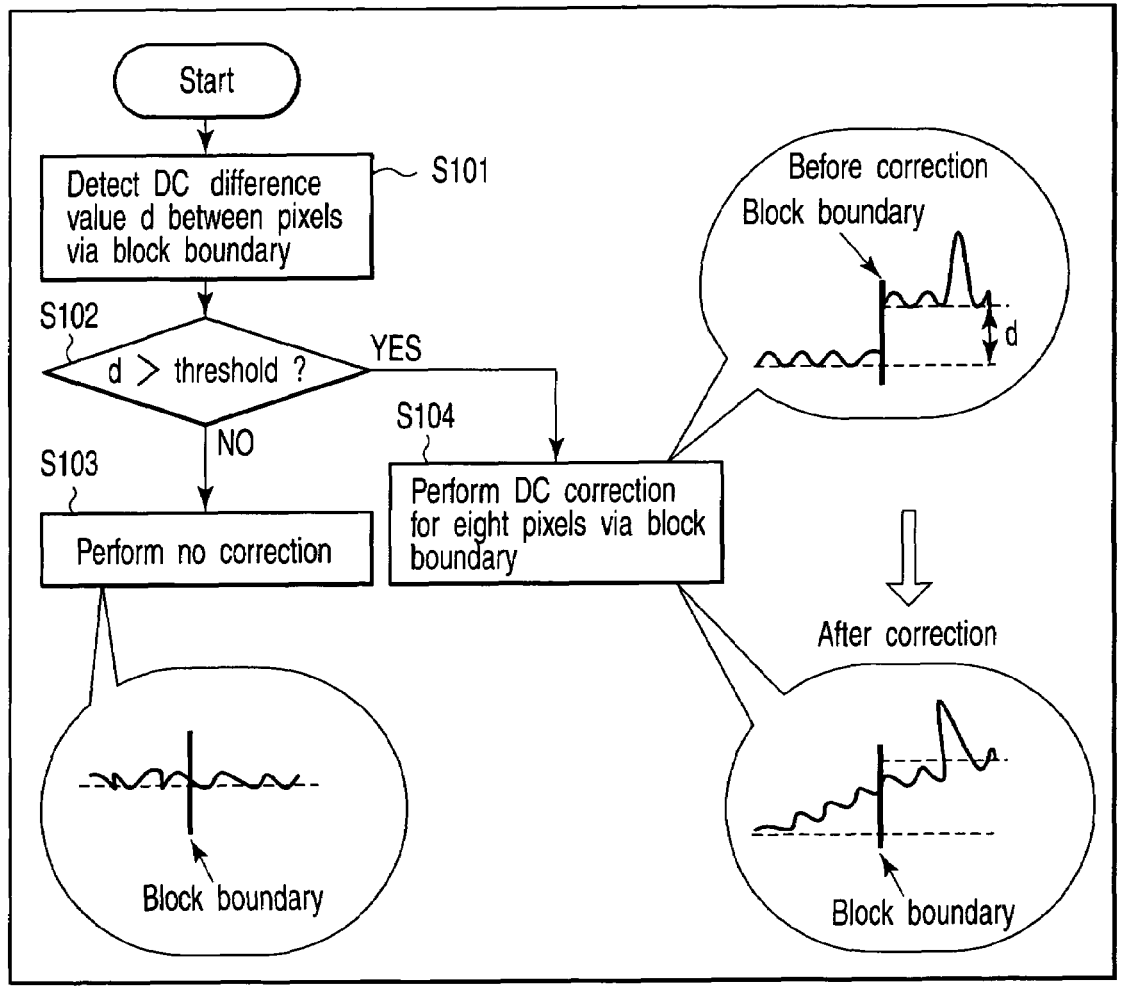
FIG. 5 is an exemplary flowchart for explaining the first example of the procedures of deblocking processing executed by the information processing apparatus in FIG. 1.

FIG. 4 represents block boundaries B1 and B2 of blocks contained in decoded moving image data. In MPEG2 encoding processing, moving image data is processed by each block of, e.g., 8×8 pixels. The block boundary B1 exists between two blocks which are adjacent to each other in the horizontal direction, whereas the block boundary B2 exists between two blocks which are adjacent to each other in the vertical direction.

For example, reduction of block noise near the block boundary B1 will be examined. In deblocking processing according to the embodiment, the deblocking processing module 212 executes the following processing.

(1) DC Difference Detection Processing

The deblocking processing module 212 detects a pixel value difference value $\underline{d}$ (to be referred to as a DC difference value $\underline{d}$ hereinafter) between two adjacent pixels (e.g., P7 and P8) which are arranged via the block boundary B1 in a direction perpendicular to the block boundary B1.

(2) DC Correction Processing

When the detected DC difference value $\underline{d}$ is larger than a predetermined value, the deblocking processing module 212 distributes the detected DC difference value $\underline{d}$ to, e.g., eight pixels P4 to P11 which are arranged via the block boundary B1 in the direction perpendicular to the block boundary B1. The deblocking processing module 212 corrects the pixel values of the eight pixels P4 to P11. As a result, the DC difference between the two pixels P7 and P8 can be eliminated.

The above-described DC difference detection and DC correction are executed for all horizontal lines perpendicular to the block boundary B1.

The first example of the procedures of deblocking processing will be explained with reference to the flowchart of FIG. 5.

The CPU 111 detects the DC difference value $\underline{d}$ between the pixels P7 and P8 between which a block boundary is interposed (block S101). The DC difference value $\underline{d}$ is the absolute value of a difference between the pixel values of the pixels P7 and P8. The CPU 111 determines whether the detected DC difference value $\underline{d}$ is larger than a predetermined threshold (block S102).

If the DC difference value $\underline{d}$ is equal to or smaller than the predetermined threshold (NO in block S102), the CPU 111 determines that no DC difference (block noise) is generated at the block boundary, and does not execute any DC correction (block S103). In this case, the pixel values of the pixels P4 to P11 near the block boundary are not corrected.

If the DC difference value $\underline{d}$ is larger than the threshold (YES in block S102), the CPU 111 determines that a DC difference (block noise) is generated at the block boundary. The CPU 111 distributes the DC difference value $\underline{d}$ to the eight pixels P4 to P11 via the block boundary B1, and corrects the pixel values of these eight pixels (block S104). In block S104, the CPU 111 calculates correction values (DC correction values) corresponding to the eight pixels P4 to P11 from the DC difference value d. Each DC correction value is a value to be distributed to each pixel, i.e., the correction amount of each pixel. The CPU 111 determines correction values corresponding to the eight pixels P4 to P11 to ensure that the distribution of values distributed as correction values to the eight pixels P4 to P11 is symmetrical about the block boundary. The CPU 111 adds the corresponding correction values to the pixel values of the eight pixels P4 to P11, and thereby corrects the pixel values of the eight pixels P4 to P11. The correction value is so set as to increase the correction amount for a pixel closer to the block boundary. By DC correction, the pixel values of the eight pixels P4 to P11 represented by "before correction" in FIG. 5 are corrected to ensure that the pixel values of the four pixels P4 to P7 on the left side of the block boundary and those of the four pixels P8 to P11 on the right side of the block boundary are almost obliquely consecutive, as represented by "after correction" in FIG. 5. As a result, the DC difference (block noise) can be reduced. In DC correction, only positive or negative correction values are added to the pixel values of the eight pixels P4 to P11, and no smoothing processing is done. Hence, no high-frequency component is lost.

The embodiment can utilize two types of DC correction: linear DC correction, and nonlinear DC correction using weighting. In linear DC correction, the CPU 111 distributes the DC difference value $\underline{d}$ to the eight pixels P4 to P11 to ensure that the distribution of values distributed as correction values to the eight pixels P4 to P11 is linear. In this case, the distributed value, i.e., DC correction value becomes larger for a pixel closer to the block boundary. The difference value between the DC correction values of adjacent pixels has the same value between any pixels.

In nonlinear DC correction, the CPU 111 distributes the DC difference value $\underline{d}$ to the eight pixels P4 to P11 by using eight weighting values corresponding to the eight pixels P4 to P11, respectively. Each of the eight weighting values is determined in accordance with the distance between a corresponding pixel and the block boundary.

A concrete example of DC correction will be explained with reference to FIGS. 6 to 8.

Figures 6, 7:
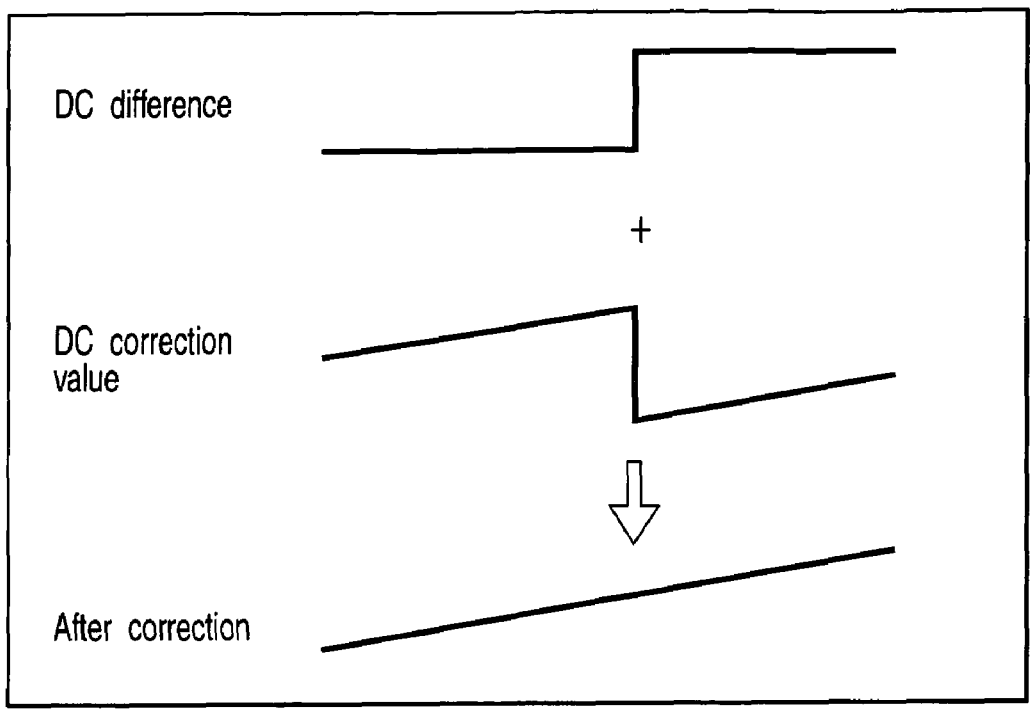
FIG. 6 is an exemplary view for explaining the principle of linear DC correction executed by the information processing apparatus in FIG. 1.
FIG. 7 is an exemplary view for explaining an example of correction equations used for linear DC correction in the information processing apparatus in FIG. 1.

FIGS. 6 and 8 schematically show states in which linear DC correction is executed. FIG. 6 shows linear DC correction when the pixel value of the pixel P8 is larger than that of the pixel P7. FIG. 8 shows linear DC correction when the pixel value of the pixel P7 is larger than that of the pixel P8.

When the pixel value of the pixel P8 is larger than that of the pixel P7, as shown in FIG. 6, i.e., a detected DC difference becomes larger rightward, four DC correction values corresponding to the four pixels P4 to P7 on the left side of the block boundary are determined to ensure that the absolute value of the correction amount increases by a predetermined amount in the order of the pixels P4 to P7. Four DC correction values corresponding to the four pixels P8 to P11 on the right side of the block boundary are determined to ensure that the absolute value of the correction amount decreases by a predetermined amount in the order of the pixels P8 to P11.

FIG. 7 shows an example of correction equations (correction equation group 1) used for linear DC correction.

For example, when the pixel value of the pixel P8 is larger than that of the pixel P7, DC correction values corresponding to the eight pixels P4 to P11 are calculated as follows.

The DC correction value of the pixel P4 is +d/8. Note that d=|p7−p8|. The DC correction value of the pixel P5 is +2d/8; that of the pixel P6, +3d/8; and that of the pixel P7, +4d/8. The DC correction value of the pixel P8 is −4d/8; that of the pixel P9, −3d/8; that of the pixel P10, −2d/8; and that of the pixel P11, −d/8.

FIG. 9 shows an example of correction equations (correction equation group 2) used for nonlinear DC correction.

A weighting value k becomes larger for a pixel closer to the block boundary. For example, when the pixel value of the pixel P8 is larger than that of the pixel P7, DC correction values corresponding to the eight pixels P4 to P11 are calculated as follows.

The DC correction value of the pixel P4 is +d/64. Note that d=|p7−p8|. The DC correction value of the pixel P5 is +4d/64; that of the pixel P6, +9d/64; and that of the pixel P7, +20d/64. The DC correction value of the pixel P8 is −20d/64; that of the pixel P9, −9d/64; that of the pixel P10, −4d/64; and that of the pixel P11, −d/64.

Figure 10:
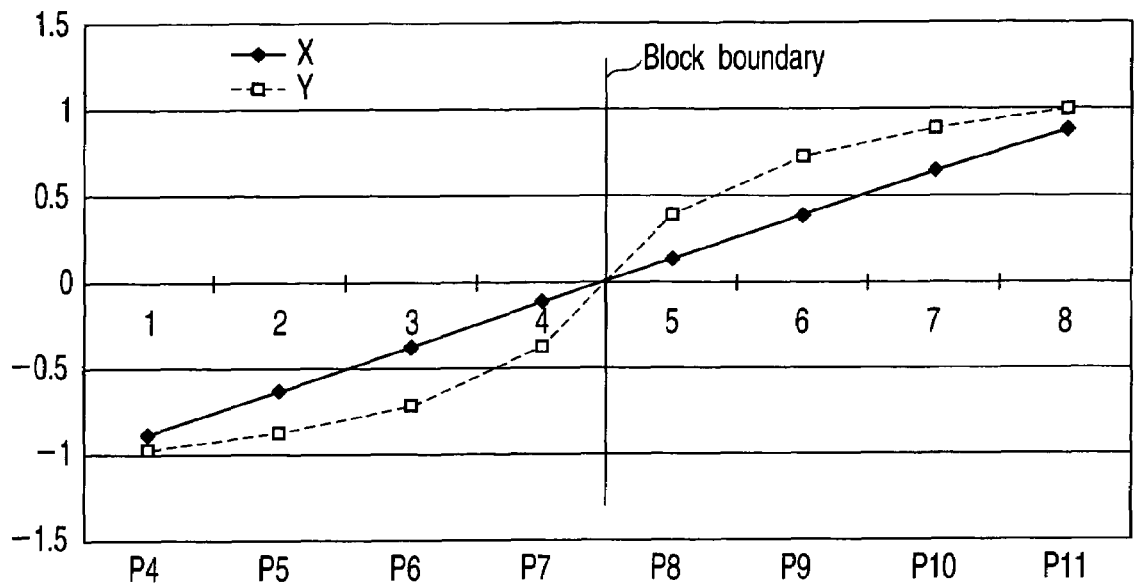
FIG. 10 is an exemplary view for explaining nonlinear DC correction executed by the information processing apparatus in FIG. 1.

FIG. 10 shows an example of the distribution of the pixel values of the eight pixels P4 to P11 after DC correction. In FIG. 10, a line X represents an example of the distribution of pixel values after linear DC correction, and a line Y represents an example of the distribution of pixel values after nonlinear DC correction. In nonlinear DC correction, a correction value applied to a pixel relatively apart from the block boundary is set much smaller than that applied to a pixel close to the block boundary. Since DC correction has a small influence on a pixel relatively apart from the block boundary, generation of so-called training noise by DC correction can be prevented at a portion relatively apart from the block boundary.

Figure 11:
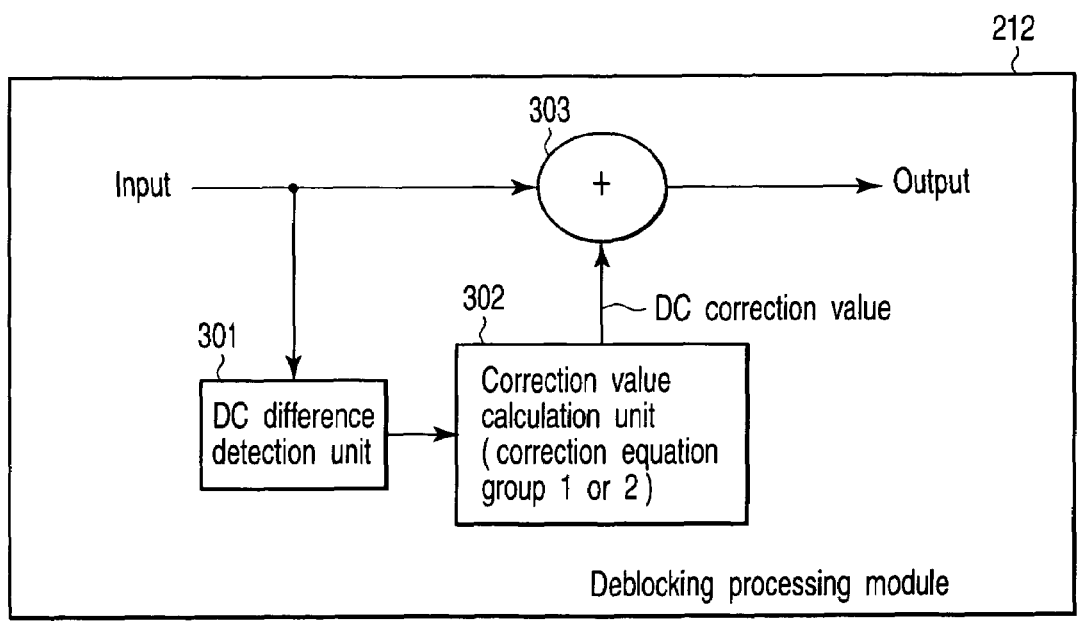
FIG. 11 is an exemplary block diagram for explaining the configuration of a deblocking processing module used in the information processing apparatus in FIG. 1.

The configuration of the deblocking processing module 212 will be explained with reference to FIG. 11.

The deblocking processing module 212 is made up of a DC difference detection unit 301, correction value calculation unit 302, and addition processing unit 303.

Decoded moving image data is sent to the DC difference detection unit 301 and addition processing unit 303. The DC difference detection unit 301 detects, as the DC difference value d, the absolute value of a difference between the two pixels P7 and P8 between which a block boundary is interposed. The correction value calculation unit 302 calculates eight DC correction values corresponding to the eight pixels P4 to P11 from the DC difference value $\underline{d}$ by using the above-described correction equation group 1 or 2. The addition processing unit 303 adds the corresponding DC correction values to the eight pixels P4 to P11, respectively.

The second example of the procedures of deblocking processing will be explained with reference to the flowchart of FIG. 12. In this embodiment, the number of pixels to which the DC difference value $\underline{d}$ is distributed is dynamically changed in accordance with the detected DC difference value d. Only a minimum pixel group is DC-corrected, and the calculation amount of deblocking processing can be greatly reduced.

The CPU 111 detects the DC difference value d between the pixels P7 and P8 between which the block boundary B1 is interposed (block S111). The CPU 111 determines whether the detected DC difference value d is larger than a predetermined first threshold (block S112).

If the DC difference value $\underline{d}$ is equal to or smaller than the first threshold (NO in block S112), the CPU 111 determines that no DC difference (block noise) is generated at the block boundary, and does not execute any DC correction (block S113). In this case, the pixel values of the pixels P4 to P11 near the block boundary are not corrected.

If the DC difference value $\underline{d}$ is larger than the first threshold (YES in block S112), the CPU 111 determines that a DC difference (block noise) is generated at the block boundary. Then, the CPU 111 determines whether the DC difference value $\underline{d}$ is smaller than a second threshold α (α<the first threshold) (block S114).

Figure 13:
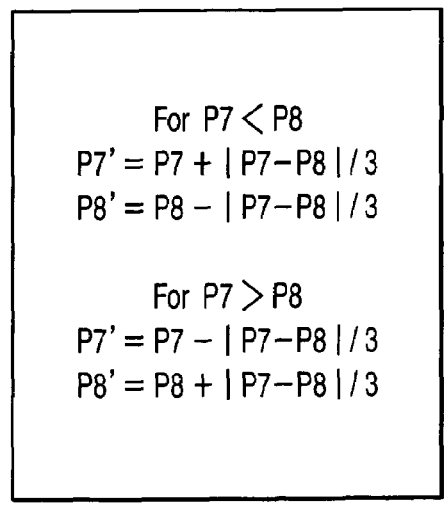
FIG. 13 is an exemplary view for explaining another example of correction equations used in the information processing apparatus in FIG. 1.

If the DC difference value $\underline{d}$ is equal to or larger than the second threshold α (NO in block S114), the CPU 111 distributes the DC difference value $\underline{d}$ to the eight pixels P4 to P11 by using linear DC correction or nonlinear DC correction described above, and corrects the pixel values of these eight pixels (block S115). If the DC difference value $\underline{d}$ is smaller than the second threshold α (YES in block S114), the CPU 111 executes DC correction to distribute the DC difference value $\underline{d}$ to the two pixels P7 and P8 (block S116). In block S116, the CPU 111 calculates DC correction values in accordance with the third correction equation group shown in FIG. 13.

Figure 14:
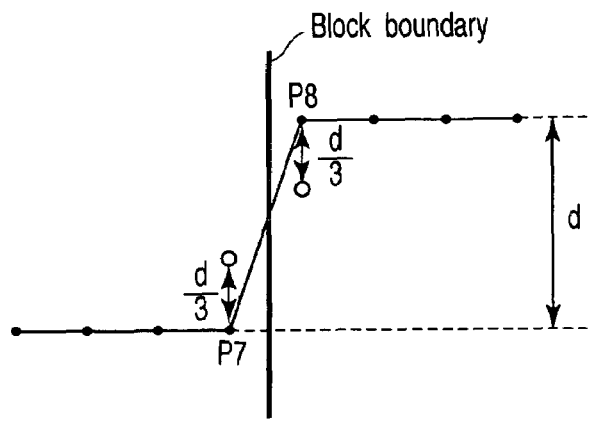
FIG. 14 is an exemplary view showing a state in which two pixels near a block boundary are DC-corrected by the information processing apparatus in FIG. 1.

More specifically, when the pixel value of the pixel P8 is larger than that of the pixel P7, the DC correction value of the pixel P7 is +d/3. Note that d=|p7−p8|. The DC correction value of the pixel P8 is −d/3. With these DC correction values, the pixel values of the pixels P7 and P8 are corrected as shown in FIG. 14, eliminating the DC difference. To the contrary, when the pixel value of the pixel P7 is larger than that of the pixel P8, the DC correction value of the pixel P7 is −d/3, and that of the pixel P8 is +d/3.

Figure 12:
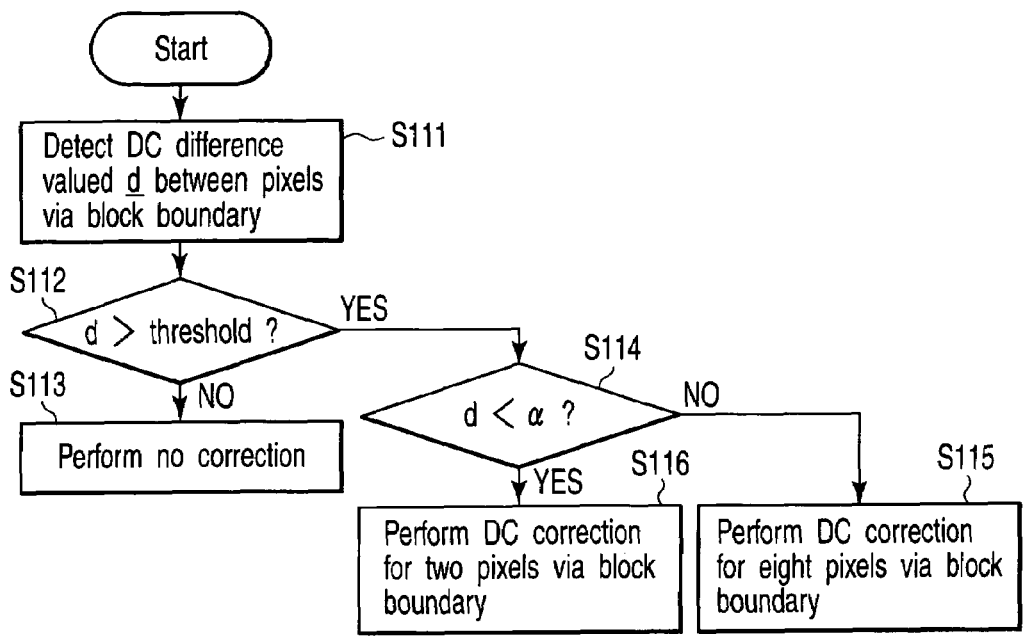
FIG. 12 is an exemplary flowchart for explaining the second example of the procedures of deblocking processing executed by the information processing apparatus in FIG. 1.

In the flowchart of FIG. 12, the pixel count subjected to DC correction is set to two values: two and eight. Alternatively, three pixel counts such as two, four, and eight may be selectively used.

As described above, the embodiment adopts DC correction of distributing the DC difference value d to a plurality of pixels near a block boundary. This DC correction can greatly reduce a necessary calculation amount, compared to conventional deblocking processing using a low-pass filter. Since no high-frequency component is lost, generation of blurred feeling in an image by deblocking processing can be prevented.

In deblocking processing according to the embodiment, the luminance value of each pixel suffices to be used as the pixel value of each pixel. Deblocking processing is not limited to moving image data, and can also be applied to still image data which is encoded by a block-encoding method such as JPEG.

The above-described deblocking processing is fully implemented by a computer program. The same effects as those of the embodiment can be easily implemented by installing the computer program in a general computer via a computer-readable storage medium.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus capable of processing image data involving a plurality of blocks, comprising:
    a difference value detection unit which detects a difference value between pixel values of two adjacent pixels that are arranged via a block boundary contained in the image data in a direction perpendicular to the block boundary;
    a correction unit which corrects pixel values of a plurality of pixels that are arranged via the block boundary in the direction perpendicular to the block boundary by distributing the difference value detected by the difference value detection unit to the plurality of pixels; and
    a unit that determines whether the difference value detected by the difference value detection unit is smaller than a predetermined threshold,
    wherein the correction unit correcting the pixel values of the two pixels by distributing the difference value to the two pixels when the difference value is smaller than the predetermined threshold, and correcting the pixel values of a plurality of pixels that are larger in number than two and are arranged via the block boundary in the direction perpendicular to the block boundary by distributing the difference value to the plurality of pixels when the difference value is not smaller than the predetermined threshold.

2. The apparatus according to claim 1, wherein the correction unit distributes the difference value to the plurality of pixels to ensure that a distribution of values distributed to the respective pixels is symmetrical about the block boundary.

3. The apparatus according to claim 1, wherein the correction unit distributes the difference value to the plurality of pixels to ensure that a distribution of values distributed to the respective pixels is linear.

4. The apparatus according to claim 1, wherein the correction unit distributes the difference value to the plurality of pixels on the basis of the difference value and a plurality of weighting values which are determined in accordance with distances between the respective pixels and the block boundary.

5. An information processing method performed by an information processing apparatus capable of processing image data involving a plurality of blocks, comprising:
    detecting, by the information processing apparatus, a difference value between pixel values of two adjacent pixels that are arranged via a block boundary contained in the image data in a direction perpendicular to the block boundary;
    correcting, by the information processing apparatus, pixel values of a plurality of pixels that are arranged via the block boundary in the direction perpendicular to the block boundary by distributing the difference value detected by the detection to the plurality of pixels; and
    determining, by the information processing apparatus, whether the difference value detected by the detection is smaller than a predetermined threshold,
    wherein the correcting of the pixel values includes correcting the pixel values of the two pixels by distributing the difference value to the two pixels when the difference value is smaller than the predetermined threshold, and correcting the pixel values of a plurality of pixels that are larger in number than two and are arranged via the block boundary in the direction perpendicular to the block boundary by distributing the difference value to the plurality of pixels when the difference value is not smaller than the predetermined threshold.

6. The method according to claim 5, wherein the correction includes distributing the difference value to the plurality of pixels to ensure that a distribution of values distributed to the respective pixels is symmetrical about the block boundary.

7. The method according to claim 5, wherein the correction includes distributing the difference value to the plurality of pixels to ensure that a distribution of values distributed to the respective pixels is linear.

8. The method according to claim 5, wherein the correction includes distributing the difference value to the plurality of pixels on the basis of the difference value and a plurality of weighting values which are determined in accordance with distances between the respective pixels and the block boundary.

* * * * *